US008379883B2

(12) United States Patent (10) Patent No.: US 8,379,883 B2
Terada et al. (45) Date of Patent: Feb. 19, 2013

(54) AUDIO MIXER AND PARAMETER SETTING METHOD THEREFOR

(75) Inventors: Kotaro Terada, Hamamatsu (JP); Hideki Hagiwara, Hamamatsu (JP); Takamitsu Aoki, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1224 days.

(21) Appl. No.: 11/849,904

(22) Filed: Sep. 4, 2007

(65) Prior Publication Data

US 2008/0069382 A1 Mar. 20, 2008

(30) Foreign Application Priority Data

Sep. 6, 2006 (JP) ................................ 2006-242028

(51) Int. Cl.
*H04B 1/00* (2006.01)

(52) U.S. Cl. ........ 381/119; 381/109; 381/123; 715/716; 715/727

(58) Field of Classification Search .................. 381/119, 381/109, 123; 715/716, 727
See application file for complete search history.

(56) References Cited

U.S. PATENT DOCUMENTS

| | | | | |
|---|---|---|---|---|
| 2003/0076966 | A1* | 4/2003 | Okabayashi | 381/119 |
| 2004/0008851 | A1* | 1/2004 | Hagiwara | 381/104 |
| 2004/0010331 | A1* | 1/2004 | Terada et al. | 700/94 |
| 2004/0184625 | A1* | 9/2004 | Okabayashi et al. | 381/119 |
| 2005/0033699 | A1* | 2/2005 | Umeo et al. | 705/56 |
| 2005/0256595 | A1* | 11/2005 | Aiso et al. | 700/94 |
| 2005/0283678 | A1* | 12/2005 | Okabayashi et al. | 714/38 |
| 2006/0015198 | A1* | 1/2006 | Okabayashi et al. | 700/94 |

OTHER PUBLICATIONS

Digital Mixing Console M7CC Owner's Manual, Yamaha Corporation, Japan, (http://www2.yamaha.co.jp/manual/pdf/pa/japan/mixers/m7c1_ja_om.pdf), Jun. 8, 2005.

* cited by examiner

*Primary Examiner* — Thao Le
*Assistant Examiner* — Eric Jones
(74) *Attorney, Agent, or Firm* — Morrison & Foerster LLP

(57) ABSTRACT

In each of a plurality of input channels of an audio mixer, there are provided a fader operator for adjusting a tone volume level, and a send level adjustment section for adjusting a send level of an audio signal to be sent from the channel to individual mixing buses. On an operation panel of the mixer, there are provided a plurality of bus selection switches in corresponding relation to the mixing buses. Once any one of the bus selection switches is depressed once, the mixing bus corresponding to the operated bus selection switch is allocated to a selected send level operator. Activation/deactivation of a Sends On Fader (SOF) function may be instructed by a user depressing any one of the bus selection switches twice in succession.

6 Claims, 6 Drawing Sheets

AUDIO MIXER AND PARAMETER SETTING METHOD THEREFOR

BACKGROUND OF THE INVENTION

The present invention relates generally to audio mixers, and more particularly to a technique for setting parameters in an audio mixer.

As well known, the audio mixers are mixing apparatus in which a plurality of audio signals allocated to a plurality of predetermined input channels are sent, at channel-specific output levels, from the individual input channels to mixing buses so that the audio signals are mixed, via the mixing buses, at mixing ratios corresponding to the output levels of the individual input channels. Among the conventionally-known digital mixers is one marketed by the assignee of the instant application under the trade name “M7CL”. On an operation panel of the digital mixer, there are provided channel strips including fader operators for manipulating a tone volume of an input signal per input channel and knob-type operators for setting a parameter per input channel, other operators including switches for performing various other settings, a touch-panel type display via which a user (human operator) of the mixer can enter data by touching a screen of the display, and so on. The user can perform various operations, such as selection of a desired function, using GUI tools (button images etc.) on various screens displayed on the display.

Level with which an audio signal is to be sent from an input channel to a mixing bus is referred to as “send level”. The send level is a parameter that is adjustable independently per input channel. The aforementioned conventionally-known digital mixer (“M7CL”) is equipped with a function which allows a user (or human operator) of the mixer to adjust the send levels of desired input channels by use of the fader operators of the input channels provided on the operation panel. Such a function which allows the user (or human operator) of the mixer to adjust the send levels of desired input channels by use of the corresponding fader operators will hereinafter be referred to as “Sends On Fader function” that will sometimes be abbreviated as “SOF function”. Basically, each screen display on the display comprises a main area for the user to perform various setting and other operations for a currently-selected function, and a function selection area for the user to select a desired function. The function selection area includes a button image for selecting the above-mentioned SOF function; thus, the SOF function can be activated by the user operating the SOF-function selecting button image.

Upon activation of the SOF function, a plurality of mixing bus selection button images, corresponding to the plurality of mixing buses provided in the mixer, are displayed on the function selection area of the displayed screen, and the user can use any one of the mixing bus selection button images to designate a desired one of the mixing buses to which audio signals are to be sent. Once such a mixing bus (i.e., sent-to or destination mixing bus) is designated by the user, a parameter allocated to a physical fader operator of each of the input channels is switched to a send level of an audio signal to be sent from the input channel to the designated mixing bus (i.e., send levels to the designated mixing bus), so that the user can use the fader operator to adjust the send level of the audio signal to be sent to the designated mixing bus (see, for example, http://www2.yamaha.co.jp/manual/pdf/pa/japan/mixers/m7cl_ja_om.pdf, which will hereinafter be referred to as “relevant non-patent literature”).

The digital mixer disclosed in the relevant non-patent literature employs a touch-panel type display, via which the user can perform various setting and other operations, function selection/switching, etc. using GUI objects (button images) on displayed screens; thus, the number of physical operators to be installed on the mixer can be significantly reduced. Such reduction in the number of physical operators to be installed accomplishes the advantageous benefits that the manufacturing cost of the mixer can be significantly reduced, the operability of the mixer can be enhanced by virtue of simplification of the operation panel and the display can have a greater size by virtue of an increased display-installing area of the operation panel. The touch-panel type display of a greater size can accomplish the advantageous benefit of an even further enhanced operability on the screen.

Namely, in the digital mixer disclosed in the relevant non-patent literature, as discussed above, the selection of the SOF function and selection of the sent-to or destination mixing bus in the SOF function can be made by the user operating corresponding ones of the button images on the displayed screens. Thus, there are provided no physical buttons (or switches) for selecting the SOF function and desired mixing bus.

However, because touch-panel type displays are expensive, such touch-panel type displays generally are not employed in digital mixers of a relatively inexpensive model of which manufacturing cost should be minimized. In digital mixers of a relatively inexpensive model it is desirable that the number of operators on the operation panel too be minimized in order to minimize the manufacturing cost. In a case where the SOF function is to be implemented in such an inexpensive model, various setting and other operation function selection/switching, etc. can be performed using GUI objects (button images) on displayed screens. In this case, it is necessary that a cursor (or pointer) for designating any desired GUI object on a displayed screen be moved by use of a physical cursor key, mouse operator or the like and then confirmation or decision operation be performed on the GUI object designated by the cursor (or pointer).

However, the operation for moving the cursor over the multiplicity of GUI objects on the displayed screen to select a desired function (SOF function) and deciding the selection of the desired function tends to be cumbersome and complicated and would require a great amount of time and labor. Because the SOF function is a frequently-used function, it is desirable that operation pertaining to the SOF function be as simple as possible and be capable of being performed as promptly as possible.

SUMMARY OF THE INVENTION

In view of the foregoing, it is an object of the present invention to provide an improved audio mixer which permits activation/deactivation (i.e., setting/cancellation) of the SOF (Sends On Fader) function.

In order to accomplish the above-mentioned object, the present invention provides an improved audio mixer, which comprises: a plurality of channels that process audio signals; a plurality of mixing buses provided as destinations of respective ones of the audio signals of the plurality of channels; a plurality of fader operators each provided for a different one of the plurality of channels, the plurality of fader operators being operable to adjust levels of the respective audio signals of the plurality of channels; a send level adjustment section provided, for each of the channels, in corresponding relation to the plurality of mixing buses, for adjusting the levels of the audio signals to be sent from individual ones of the channels to individual ones of the mixing buses; a plurality of bus selection switches provided in corresponding relation to the plurality of mixing buses; a bus selection section that, in response to operation of any one of the bus selection switches according to a first operation scheme, selects one of the plurality of mixing buses that corresponds to the operated bus selection switch; a mode setting section that, in response to operation of any one or more of the bus selection switches according to a second operation scheme, switches an operation mode of each of the fader operators from an ordinary mode, where the level of the audio signal is adjusted, to a special mode where a parameter of the send level adjustment section is set by use of the fader operator; and a control section that, in the ordinary mode and in response to operation of the fader operator, adjusts the level of the signal of the channel corresponding to the operated fader operator, and, in the special mode and in response to operation of the fader operator, adjusts the send level of the signal to be sent from the channel, corresponding to the operated fader operator, to the mixing bus selected by the bus selection section.

As one example, the second operation scheme or switching the operation mode of the fader operators) comprises operating any one of the bus selection switches twice in succession. As one example, in the special mode, the mode setting section further deactivates or cancels the special mode in response to operation of any one or more of the bus selection switches according to the second operation scheme. As one example, the audio mixer further comprises an allocation section that, in the special mode and in response to operation of any one of the bus selection switches according to the first operation scheme (for selecting one of the mixing buses), allocates parameters of respective send levels of the audio signals, to be sent from the plurality of channels to the mixing bus selected by the bus selection section, to the individual fader operators. As one example, the audio mixer further comprises a light emitting section provided in each of the plurality of bus selection switches, and a mode setting by the mode setting section is indicated by a light emitting (illuminating) state of the light emitting section.

By a user operating any one of the plurality of bus selection switches, provided in corresponding relation to the plurality of buses, according to the first operation scheme (e.g., one depression of the bus selection switch), the user can select one of the mixing buses which corresponds to the operated bus selection switch. Further, by the user operating any one or more of the plurality of bus selection switches according to the second operation scheme (e.g., two depressions of a same bus selection switch), the user can switch the operation mode of each of the fader operators from an ordinary signal level adjustment function (ordinary mode) to the special mode (Sends On Fader or SOF mode) where a parameter of the send level adjustment section is set by use of the fader operator. In response to operation of the fader operator while in the ordinary mode, the level of the signal of the channel corresponding to the operated fader operator can be adjusted. Further, in response to operation of the fader operator while in the special mode, the send level of the signal to be sent from the channel, corresponding to the operated fader operator, to the mixing bus selected by the bus selection section can be adjusted. Further, in the special mode (SOF function) set or activated by the mode setting section, the special mode may be canceled or deactivated by the mode setting section in response to operation of the bus selection switch according to the second operation scheme. Thus, the present invention can accomplish the superior benefit that the user is allowed to perform, even in a mixer of a relatively inexpensive model equipped with no touch-panel type display, the operations for activating/deactivating the SOF function and selecting an object of operation to be performed by the SOF function in a prompt manner with a superior operability without unnecessarily increasing the number of component parts. Further, by the user operating any one of the bus selection switches according to the above-mentioned first operation scheme (e.g., by one depression of the bus selection switch) in the special mode (SOF function) set by the mode setting section, one of the mixing buses can be selected as an object of operation to be performed by the SOF function. Thus, selection of an object of operation to be performed by the SOF function can be performed in a sensuously-easy-to-recognize manner.

The present invention may be constructed and implemented not only as the invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION

Figure 1:
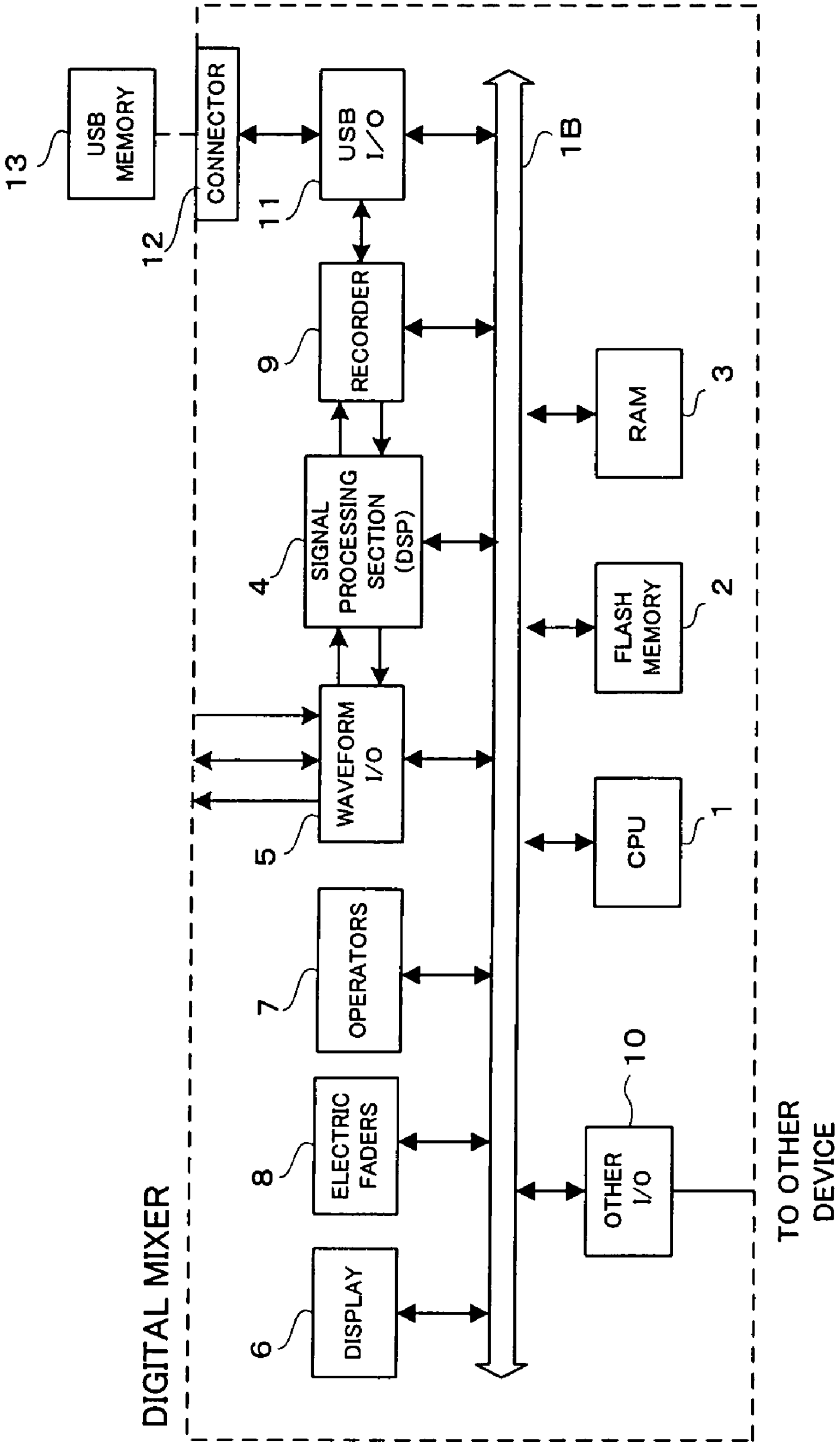
FIG. 1 is a block diagram showing an example electric hardware setup of a digital audio mixer in accordance with an embodiment of the present invention.

FIG. 1 is a block diagram showing an example electric hardware setup of a digital audio mixer 100 in accordance with an embodiment of the present invention. The digital mixer 100 includes a CPU 1, a flash memory 2, a RAM 3, a signal processing circuit (DSP) 4, a waveform input/output interface (waveform I/O) unit 5, a display 6, various operators 7, electric faders 8, a recorder 9, another interface (I/O) 10 and a USB interface (I/O), and these components are connected with one another via a bus IB.

Microcomputer, comprising the above-mentioned CPU 1, flash memory 2 and RAM 3, executes various control programs stored in the flash memory 2 or RAM 3, to thereby control behavior of the entire mixer 100. The flash memory 2 or RAM 3 includes a current memory area for storing therein various parameters etc. currently set in the mixer. The DSP 4 performs digital signal processing on audio signals. The waveform I/O unit 5 includes analog input ports, analog output ports and digital input/output ports, and audio cables are connected to the waveform I/O unit 5. Each analog audio signal input via the waveform I/O unit 5 is converted into digital representation and then supplied to the DSP 4, and the DSP 4 performs signal processing on the supplied digital audio signal on the basis of instructions given from the CPU 1. Digital audio signals generated as a result of the signal processing by the DSP 4 are output to the outside via the waveform I/O unit 5 after being converted into analog representation. Further, digital audio signals can be communicated between the mixer 100 and a digital sound device connected to the mixer 100 via the waveform I/O unit 5.

The display 6, various operators 7 and electric faders 8 are user interlaces provided on an operation panel to be later described in detail in relation to FIGS. 3 and 4. The user of the mixer can use the various operators 7 and electric faders 8 to perform various operation related to mixing processing, such as operation for setting various parameters and instructing activation of various functions. Further, each of the electric faders 8 has provided therein a motor for automatically controlling an operating position of a fader knob thereof, so that the operating position of the fader knob of each of the electric faders 8 is controlled on the basis of a drive signal given from the CPU 1.

The display 6, which is for example in the form of a liquid crystal display (LCD), shows display screens corresponding to various functions of the audio mixer 100, and, through the GUI objects (e.g., button images) on the displayed screens, the user of the mixer 100 can make settings related to the entire system and settings of parameters for various functions. Let it be assumed that the instant embodiment of the mixer 100 is of a relatively inexpensive model where the display 6 is not a touch-panel type display, and hence that various operation based on the GUI objects (e.g., button images) on the displayed screens of the display 6 are performed using a cursor key, ENTER (decision key) key, etc. included in the group of operators 7.

The above-mentioned other I/O 10 is, for example, a network interface of the Ethernet (registered trademark), via which an external device, such as a personal computer containing an application program for remote-controlling the audio mixer 100 of the invention, is connectable to the audio mixer 100. Further, a USB memory 13 is connectable to the audio mixer 100 via a connector (USB terminal) 12 connected to a USB I/O 11 of the mixer 100. Mixer interior data, such as setting data of the DSP 4, of the mixer 100 may be transferred to the recorder 9 and then saved or loaded to the USB memory 13.

Figure 2:
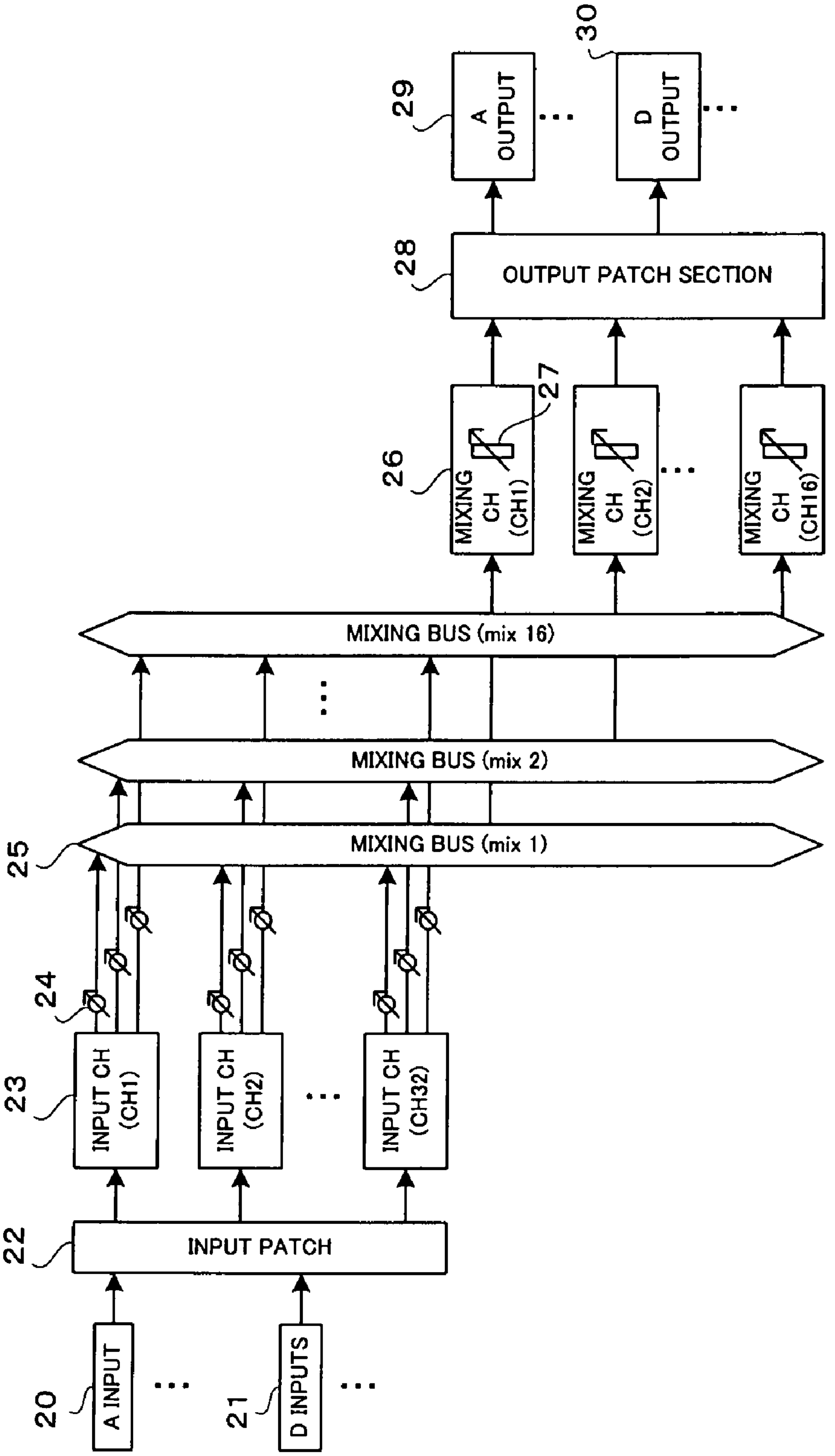
FIG. 2 is a block diagram outlining example structural arrangements for audio signal processing performed in the embodiment of the digital mixer.

FIG. 2 is a block diagram outlining example structural arrangements for audio signal processing performed by the DSP 4. As shown, the digital mixer 100 includes a plurality of analog input ports (A inputs) 20 for inputting a plurality of analog audio signals, and a plurality of digital input ports (D inputs) 21 for inputting a plurality of digital audio signals.

Input patch section 22 selectively connects each of the input ports (A inputs 20 or D inputs 21) to any one of a plurality of input channels 23 to thereby allocate the signal from each of the input ports (A inputs 20 or D inputs 21) to any one of the input channels 23. Further, data indicative of the connections, in the input patch section 22, between the individual input channels 23 and the input ports are stored as "patch data" in a suitable memory, such as the flash memory 2 or RAM 3. Note that, in this specification, associating and connecting the input ports and the input channels or associating and connecting the output ports and output-side channels are referred to as "patch".

The plurality of input channels 23 (in the illustrated example, 32 (thirty two) input channels CH1-CH32) each include: parameter setting sections for setting values of parameters, such as limiter, compressor, equalizer, tone volume fader and panning parameters, to be applied to a digital audio signal allocated from the corresponding input port; thus, characteristics and level of the audio signal input to each of the input channels 23 are adjusted on the basis of parameter values set by the user via the parameter setting sections. Further, each of the input channels 23 is connected to individual ones of a predetermined plurality of mixing buses 25 (in the illustrated example, 16 (sixteen) mixing buses "mix1"-"mix16"), and, in association with each of the plurality of mixing buses 25, the input channel 23 includes an output destination selection section for turning on/off output to the mixing bus 25 and a send level adjustment section 24 for adjusting the send level of an audio signal to be sent to the mixing bus 25. Namely, the send level adjustment section 24 is a module for adjusting the send level with which an audio signal is be sent from the input channel 23 to the mixing bus 25. The user can transmit an output signal of each of the input channels 23 to a desired one of the mixing buses 25, selected via the output destination selection section of each of the input channels 23, with the send level corresponding to a parameter setting by the send level adjustment section 24. Each of the mixing buses 25 mixes together the signals received from the input channels 23 in accordance with a mixing ratio corresponding to signal output levels of the individual input channels 23.

A plurality of (16 in the illustrated example) mixing channels (CH1-CH16) 26, corresponding to the plurality of mixing buses 25, each include a mixed output adjustment section 27 for adjusting a signal output level of the mixing channel; thus, the mixed output adjustment section 27 can set an output level of digital audio signals sent from the corresponding mixing bus 25. Further, each of the mixing channels 26 includes, in addition to the mixed output adjustment section 27, parameter setting sections for setting values of parameters, such as limiter, compressor and equalizer parameters, to be applied to the audio signals; thus, characteristics of the audio signals can be adjusted independently per mixing channel 26.

Output patch section 28 selectively connects each of the mixing channels 26 to any one of a plurality of analog output ports (A outputs) 29 or digital output ports (D outputs) 30 to thereby allocate the output of the mixing channel 26 to any one of the output ports (A outputs 29 or D outputs 30); thus, audio signals having been subjected user-desired mixing processing are output from the A or D outputs 29 or 30.

Figure 3:
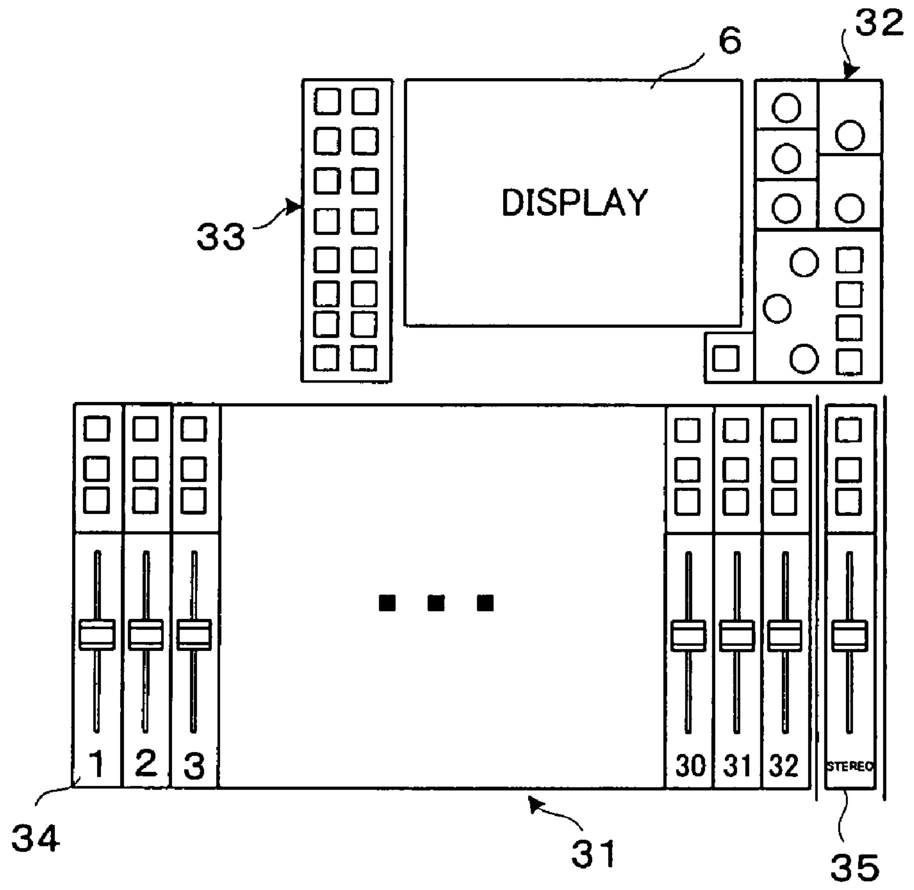
FIG. 3 is an outer appearance view showing principal sections of an operation panel in the embodiment of the mixer.

FIG. 3 is an outer appearance view showing principal sections of the operation panel of the digital audio mixer 100 according to the instant embodiment. On the operation panel, there are provided the display 6 and a multiplicity of operators (corresponding to the operators 7 and electric faders 8 shown in FIG. 2). The multiplicity of operators provided on the operation panel are generally divided into a plurality of functional sections: a channel strip section 31 including a plurality of channel strips; a selected channel section 32 for manipulating any one of principal parameters of a channel selected by the user; and a mixing bus selection section 33 for selecting a mixing bus as an object of operation. Although not specifically illustrated and described here, other operators having other functions than the aforementioned may be provided on the operation panel.

The channel strip section 31 includes an input channel section 34 and a stereo master section 35. In the illustrated example of FIG. 3, 32 (thirty two) channel strips are provided in the input channel section 34 in corresponding relation to the plurality of (32 in this case) input channels 23.

Figure 4A:
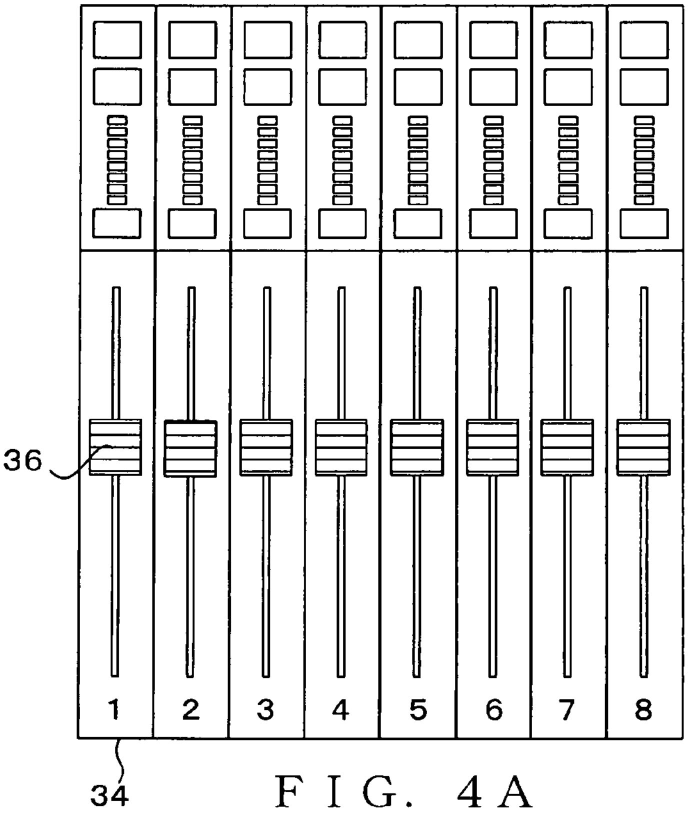
FIG. 4A is a diagram showing in enlarged scale an input channel section of the operation panel shown in FIG. 3.
Figure 4B:
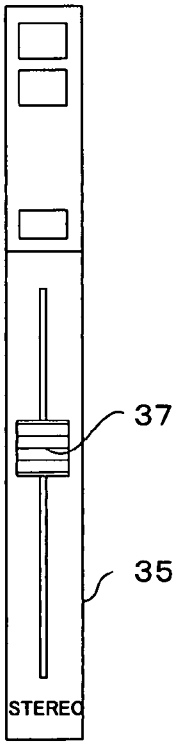
FIG. 4B is a diagram showing in enlarged scale a stereo master section of the operation panel.

FIG. 4A shows in enlarged scale a part of the input channel section 34. Each of the channel strips in the input channel section 34 includes a fader operator 36 (corresponding to the electric fader 8 of FIG. 1) for adjusting the tone volume level of the input channel 23 allocated to the channel strip, and switches for setting various parameters of the input channel 23. By operating the fader operator 36 of any one of the channel strips, the user can adjust the tone volume level of the input channel 23 allocated to the channel strip. Further, one channel strip section is provided in the stereo master section 35. FIG. 4B shows in enlarged scale the stereo master section 35. The channel strip section provided in the stereo master section 35 includes a fader operator 37 (corresponding to the electric fader 8 of FIG. 1) for adjusting a master output level, and switches for setting various parameters related to the master output. By operating the fader operator 37 of the stereo master section 35, the user can adjust the master output level. Namely, the channel strip section 31 on the operation panel includes a plurality of fader operators 36 and 37, so that the user can use the plurality of fader operators 36 and 37 to adjust the tone volumes of the audio signals supplied to the individual channels.

In the “Sends On Fader (SOF) mode” of the present invention, as will be later described in detail, each of the fader operators 36 of the input channel section 34 functions as an operator for adjusting the send level of an audio signal to be sent from the input channel to a mixing bus selected as an object of operation to be performed by the SOF function, while the fader operator 37 of the stereo master section 35 functions as an operator for adjusting the output level of the mixing bus selected as the object of operation.

The channel strips of the input channel section 34 or the stereo master section 35 may include, in addition to the fader operators 36 or 37, a switch for selecting the channel in question as an object of operation to be performed by the selected channel section 32, a switch for selecting the channel in question as an object of cue monitoring, a switch for switching between ON and OFF states of the channel, etc. Further, output-side channels, such as the mixing channels 26, may be operated via the input channel section 34.

Figure 4C:
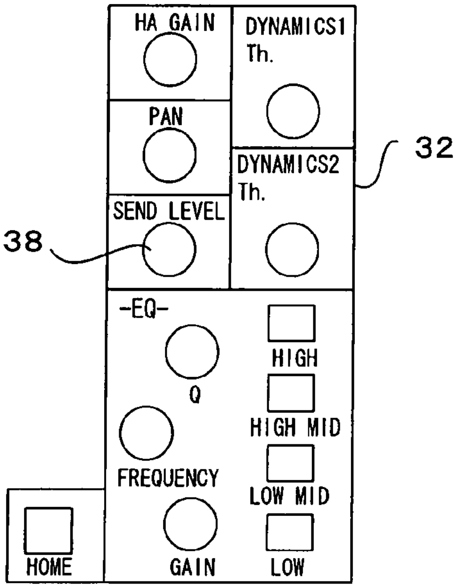
FIG. 4C is a diagram showing in enlarged scale a selected channel section of the operation panel.

FIG. 4C shows in enlarged scale of the selected channel section 32. The selected channel section 32 includes operators for manipulating or operating a head amplifier gain, panning, equalizer (EQ) and selected send level of one particular channel selected by the user. The selected send level operator 38 is for example in the form of a rotary encoder, and a value of a currently-allocated parameter is changed in response to rotational operation of the selected send level operator 38. In the case where the channel currently selected as an object of operation to be performed by (or allocated to) the selected channel section 32 is one of the input channels 23, a parameter of a send level (i.e., “send level” parameter set by the send level adjustment section 24 of FIG. 2) of an audio signal to be sent from the input channel 23 to a desired mixing bus selected by the mixing bus selection section 33 is allocated to the selected send level operator 38.

Figure 4D:
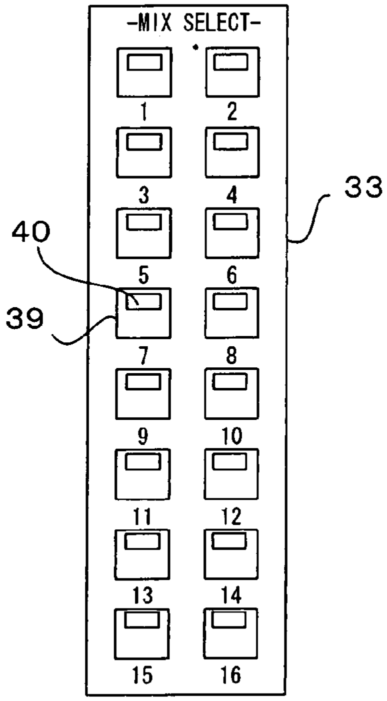
FIG. 4D is a diagram showing in enlarged scale a mixing bus selection section of the operation panel.

FIG. 4D shows in enlarged scale the mixing bus selection section 33. The mixing bus selection section 33 includes a plurality of bus selection switches 39 corresponding to the plurality of mixing buses 25 (in this case, 16 mixing buses “mix1”-“mix16”), so that the user can select any desired one of the mixing buses 25 by operating a corresponding one of the bus selection switches 39. The plurality of bus selection switches 39 are assigned respective switch Nos. (“1”-“16”); let it be assumes that these switch numbers correspond to the bus Nos. (“mix1”-“mix16”) of the mixing buses 25. Further, an LED illumination section (hereinafter also referred to merely as “LED”) 40 is provided in each of the bus selection switches 39 so that a current state of the bus selection switch 39 can be indicated by an illumination (or light emission) state of the LED illumination section 40.

In the instant embodiment of the invention, each of the bus selection switches 39 performs either one of two functions, i.e. a function for selecting one of the mixing buses and a function for switching between operation modes of the fader operators 36, 37. Namely, by operating any one of the bus selection switches 39, the user can give an instruction for switching between the ON and OFF states of the SOF function. Also, when the SOF function is OFF, the user can operate any one of the bus selection switches 39 to select a desired signal destination mixing bus for a channel currently allocated to the selected channel section 32, namely, select an object of operation to be performed by the selected send level operator 38. When the SOF function is ON (i.e., in the SOF mode), on the other hand, the user can operate any one of the bus selection switches 39 to select a desired mixing channel that should become an object of operation to be performed by the SOF function. Note that, in this specification, the operation mode in which the SOP function is OFF will be referred to as “ordinary mode” while the operation mode in which the SOF function is ON will be referred to as “SOF mode” that corresponds to a “special mode” mentioned in the appended claims.

Now, with reference to a flow chart of FIG. 5, a description will be given about processing for switching the operation mode of the fader operators 36, 37. This operation mode switching processing is started up in response to operation, by the user, of any one of the bus selection switches 39. First, at step S1, the operational state the operated bus selection switch 39 was in immediately before the operation is checked. In the instant embodiment of the present invention, each of the bus selection switches 39 operable by the user takes, at any given time, any one of the following three operational states: 1) an operational state in which the switch 39 has selected the mixing bus, corresponding thereto, as an object of operation to be performed by the selected send level operator 38 (in the ordinary mode); 2) an operational state in which the switch 39 has selected the corresponding mixing bus as an object of operation to be performed by the SOF function (in the SOF mode); and 3) a non-operating state. The LED illumination section 40 provided in each of the bus selection switches 39 is controlled to switch among 1) an illuminated state, 2) a blinked state and 3) a non-illuminated state depending on which one of the three operational states the bus selection switch 39 is in. Namely, the illuminated state, blinked state and non-illuminated state occurs in correspondence with the above-mentioned operational states 1), 2) and 3), respectively, of the bus selection switch 39. Let it be assumed that, in the instant embodiment, the “blinked state” is realized by blink control being performed on the LED illumination section 40 such that the LED is sequentially illuminated and deilluminated alternately at predetermined short intervals. It should be noted that the fader operators are always held in either one of the two operation modes, i.e. ordinary and SOF modes, in such a manner that the operation mode of the fader operators is switched between the ordinary and SOF modes in response to operation of any one of the bus selection switches 39. Namely, in interlocked relation to operation-mode switching operation of any one of the bus selection switches 39, the operation mode of all of the fader operators 36, 37 is set to the new or switched-to operation of the one bus selection switch 39. It should be noted that any one of the plurality of bus selection switches 39 is in an operating state at any given time; namely, the LED illumination section 40 of any one of the bus selection switches 39 is in the illuminated or blinked state at any given time.

Figure 5:
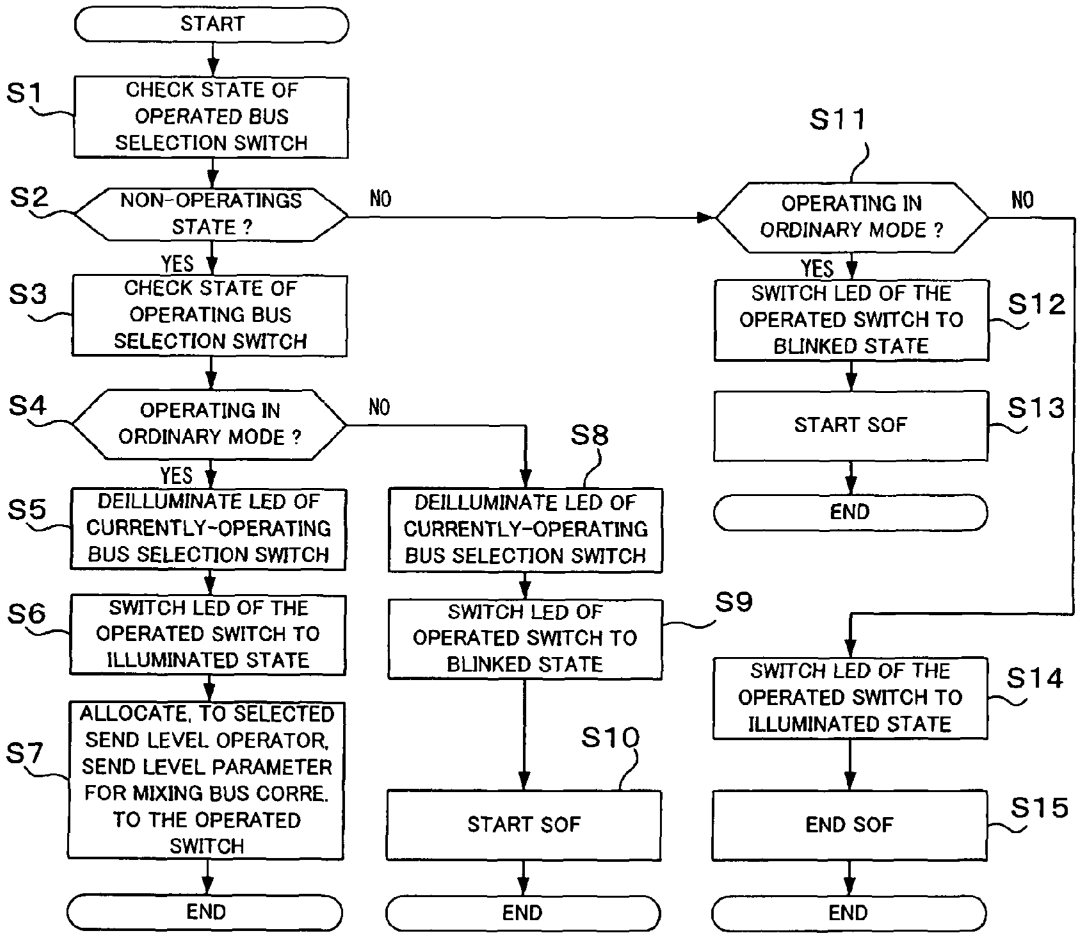
FIG. 5 is a flow chart showing an example operational sequence of operation mode switching processing performed in the embodiment in response to operation of a bus selection switch.

At next step S2 of FIG. 5, a determination is made, on the basis of the result of the operational state check at step S1, as to whether the operated bus selection switch 39 was in the non-operating state (i.e., state 3) above) immediately before the operation; with this determination, it can be determined, at subsequent steps, whether operation mode switching is to be effected or not. Namely, if one of the bus selection switches 39 which corresponds to the mixing bus selected as the object of operation to be performed in the ordinary mode or by the SOF function, i.e., one of the bus selection switches 39 whose LED 40 was being illuminated or blinked, has been operated (NO determination at step S2), operation mode switching is effected from the ordinary mode to the SOF mode or from the SOF mode to the ordinary mode, at and after steps S11. If, on the other hand, the operated bus selection switch 39 was in the non-operating state (i.e., the LED 40 was in the non-illuminated state) immediately before the operation of the switch 39 (YES determination at step S2), no operation mode switching is effected, and switching is effected to the mixing bus selected as the object of operation to be performed in the currently-set ordinary mode or SOF mode.

First, a description is given about the case where no operation mode switching is effected (i.e., where the operated bus selection switch 39 was in the non-operating state) (YES determination at step S2). In this case, any one of the other bus selection switches 39 than the operated bus selection switch 39 is in the operating (or selected) state. Thus, a determination is made at step S3, on the basis of the operational state of the other bus selection switch 39 (that was in the selected state immediately before the operation of the bus selection switch 39), as to which one of the ordinary mode and SOF mode the operation mode of the fader operators 36, 37 is set in.

If the fader operators 36, 37 are operating in the ordinary mode (YES determination at step S4), the LED 40 of the currently-operating bus selection switch 39 is deilluminated at step S5, and the LED 40 of the above-mentioned operated bus selection switch 39 is switched to the illuminated state at step S6, and a “send level” parameter, which is to be applied to the mixing bus corresponding to the operated bus selection switch 39, of the channel currently allocated to the selected channel section 32 is allocated to the selected send level operator 38 at step S7. In this way, the object of operation to be performed by the selected send level operator 38 can be switched to the mixing bus corresponding to the operated bus selection switch 39.

If, on the other hand, the fader operators 36, 37 are operating in the SOF mode (NO determination at step S4), it means that the LED 40 of the currently-operating bus selection switch 39 is in the blinked state. Thus, the LED 40 of the currently-operating bus selection switch 39 is deilluminated at step S8, and the LED 40 of the above-mentioned operated bus selection switch 39 is blinked at step S9. Then, a process of the “Sends On Fader (SOF) mode” is started at step S10, through an SOF mode starting process to be later described with reference to FIG. 6, so that the mixing bus corresponding to the operated bus selection switch 39 can be set as an object of operation to be performed by the SOF function.

Next, a description is given about the case where operation mode switching is effected, i.e. where the bus selection switch 39 operated by the user was in the operating state (namely, where the mixing bus corresponding to the operated bus selection switch 39 has been selected in the ordinary mode or SOF mode and the LED 40 of the operated bus selection switch 39 was being illuminated or blinked) (NO determination at step S2. At next step S11, a determination is made, on the basis of the checked operational state of the operated bus selection switch 39, as to which one of the ordinary mode and SOF mode the operated bus selection switch 39 was in, to thereby determine a current operation mode of the fader operators 36, 37.

If the fader operators 36, 37 are operating in the ordinary mode, i.e., the LED 40 of the operated bus selection switch 39 was in the illuminated state) (YES determination at step S11), control is performed at step S12 to switch the LED 40 of the operated bus selection switch 39 from the illuminated state to the blinked state. The process of the “Sends On Fader (SOF) mode” is started at step S13, through the SOF mode starting process to be later described with reference to FIG. 6, so that the operation mode is switched from the ordinary mode to the SOF mode and the operated bus selection switch 39 can be set as an object of operation to be performed by the SOF function.

If the fader operators 36, 37 are operating in the SOF mode i.e., the LED 40 of the operated bus selection switch 39 was in the blinked state) (NO determination at step S11), control is performed at step S14 to switch the LED 40 of the operated bus selection switch 39 from the blinked state to the illuminated state. The process of the SOF mode is brought to an end at step S15, through an SOF mode ending process to be later described with reference to FIG. 7, so that the operation mode is switched from the SOF mode to the ordinary mode and the operated bus selection switch 39 can be set as an object of operation to be performed by the selected send level operator 38.

Figure 6:
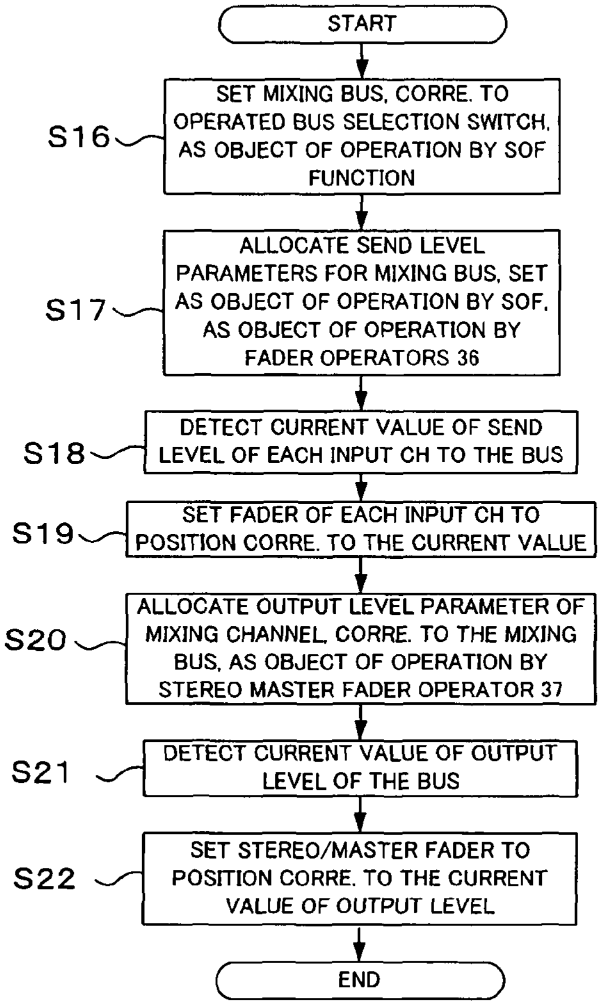
FIG. 6 is a flow chart showing an example operational sequence of an SOF function (mode) starting process performed in the embodiment.

FIG. 6 is a flow chart showing an example operational sequence of the SOF mode starting process started at step S10 or S13 above. First, at step S16, the mixing bus corresponding to the bus selection switch 39 operated by the user is set as an object of operation to be performed by the SOF function. Namely, the mixing bus (any one of mixing buses “mix1”-“mix16”) corresponding to the switch number (any one of “1”-“16”) of the user-operated bus selection switch 39 is set as an object of operation to be performed by the SOF function.

First, at step S17-S18, the object of operation to be performed by each of the individual fader operators 36 in the input channel section 34 is switched to the “send level” parameter for the mixing bus set as the object of operation to be performed by the SOF function. Namely, the “send level” parameters (i.e., parameters set by the send level adjustment sections 24 of FIG. 2) for the mixing bus, currently set as the object of operation to be performed by the SOF function, are allocated as the object of operation to be performed by the individual fader operators 36. Then, for the mixing bus currently set as the object of operation to be performed by the SOF function, current settings of the send levels of the individual input channels 23 are read out, at step S18, from the current memory area (flash memory 2 or RAM 3), and the operating knobs of the individual fader operators 36 are set, at step S19, to positions corresponding to the read-out current settings of the send levels of the individual input channels 23. Because the fader operators 36 correspond to the electric faders 8 (FIG. 1) as noted above, the operating knobs of the individual fader operators 36 are automatically moved through motor drive control by the CPU 1, in response to the switching of the function allocated to the fader operators 36, to positions corresponding to the read-out current settings of the send levels. As explained above in relation to FIG. 3, a plurality of (32 in the instant embodiment) channel strips are provided in the input channel section 34, and one fader operator 36 is provided in each of the plurality of channel strips. Thus, at steps S17-S18, "send level" parameters from the input channels, corresponding to the individual channel strips, to the mixing bus, currently set as the object of operation to be performed by the SOF function, are allocated to the individual ones of the 32 fader operators 36, but also movement control is performed on the operating knobs of the individual fader operators 36.

Next, at steps S20-S23, the object of operation to be performed by the fader operator 37 in the stereo master section 35 is switched to a "send level" parameter for the mixing bus set as the object of operation to be performed by the SOF function. Namely, at step S20, an "output level" parameter (i.e., parameter set by the mixed output adjustment section 27) of the mixing channel 26, corresponding to the mixing bus that corresponds to the bus selection switch 39 operated by the user, is allocated as the object of operation to be performed by the fader operator 37 in the stereo master section 35 (see FIG. 2). Then, the current setting of the output level of the mixing channel 26 is read out, at step S21, from the current memory area (flash memory 2 or RAM 3), and the operating knob of the fader operator 37 is set, at step S22, to a position corresponding to the read-out current setting of the output level. Because the fader operator 37 too corresponds to one of the electric faders 8 (FIG. 1) as noted above, the operating knob of the fader operator 37 is automatically moved, through motor drive control by the CPU 1, to the position corresponding to the read-out current setting of the output level.

Thus, at steps S16-S22, the SOF function is started, and the send levels to be applied the mixing bus currently set as the object of operation can be adjusted by use of the fader operators 36 of the input channel section 34 while the output level of the mixing channel 26 corresponding to the mixing bus set as the object of operation can be adjusted by use of the fader operator 37 of the stereo master section 35.

Figure 7:
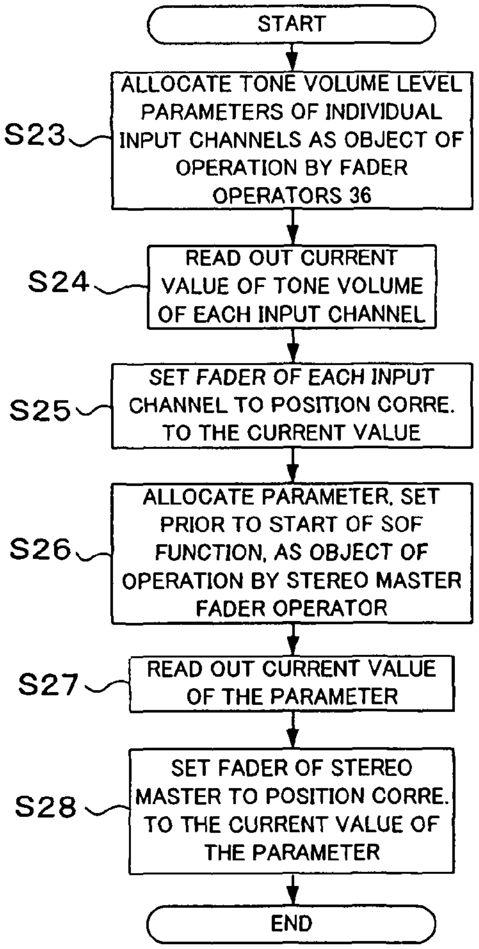
FIG. 7 is a flow chart showing an example operational sequence of an SOF function (mode) ending process performed in the embodiment.

FIG. 7 is a flow chart showing an example operational sequence of the SOF mode ending process started at step S15 above. First, at steps S23-S25, the object of operation to be performed by the individual fader operators 36 in the input channel section 34 is switched to "tone volume level parameters" of the individual input channels. Namely, "tone volume level parameters" of the individual input channels are allocated as the object of operation to be performed by the individual fader operators 36. Then, the current settings of the tone volume levels of the individual input channels 23 are read out, at step S24, from the current memory area (flash memory 2 or RAM 3), and the operating knobs of the individual fader operators 36 are set, at step S25, to positions corresponding to the read-out current settings of the tone volume levels of the individual input channels 23. The operations at steps S23-S25 too are performed for each of the plurality of fader operators 36 in the input channel strips 34.

Further, at steps S26-S28, the object of operation to be performed by the fader operator 37 in the stereo master section 35 is switched to a parameter that was being set prior to the start of the SOF function. Namely, the parameter (normally, output level of the stereo master channel) that was being set prior to the start of the SOF function is allocated, at step S26, as the object of operation to be performed by the fader operator 37 in the stereo master section 35. Then, the current setting of the parameter in question is read out, at step S27, from the current memory area (flash memory 2 or RAM 3), and the operating knob of the fader operator 37 of the stereo master section 35 is set, at step S28, to a position corresponding to the read-out current setting.

Thus, at steps S23-S28, the SOF function is ended so that the operation in the ordinary mode is resumed, and the tone volume levels of the individual input channels 23 can be adjusted by use of the fader operators 36 of the input channel section 34 while the allocated parameter (normally, stereo master output level) can be adjusted by use of the fader operator 37 of the stereo master section 35.

Figure 8:
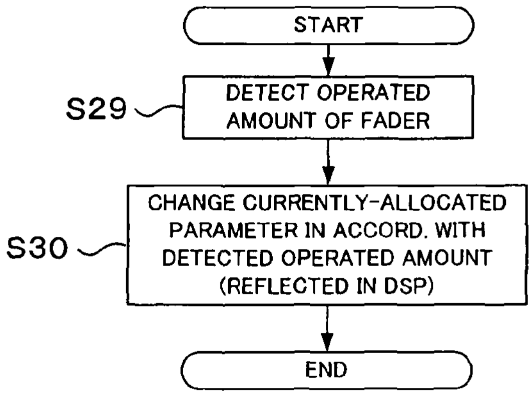
FIG. 8 is a flow chart showing an example operational sequence of parameter setting performed in the embodiment in response to operation of a fader operator.

FIG. 8 is a flow chart showing an example operational sequence of a parameter setting process performed in response to operation of any one of the fader operators 36 and 37. Once any one of the fader operators 36 and 37 is operated by the user, an operated amount of the operated fader operator 36 or 37 is detected at step S29. Then, the parameter value currently allocated to the operated fader operator 36 or 37 (i.e., value currently stored in the current memory area) is changed in accordance with the detected operated amounts and the thus-changed parameter value is reflected in the DSP 4 (step S30). Thus, with the SOF function, the send level for the mixing bus set as the object of operation can be changed in response to operation of the parameter value 36, or the output level of the mixing channel 26 corresponding to the mixing bus set as the object of operation can be changed by use of the fader operator 37 of the stereo master section 35.

According to the instant embodiment, as having been described above, the operation mode of the fader operators can be switched to the SOF mode by the user depressing a particular bus selection switch 39 currently operating in the ordinary mode (i.e., bus selection switch 39 of which the LED 40 was in the illuminated state immediately before the depression or operation). Further, in the SOF mode, a particular mixing bus to be set as the object of operation to be performed by the SOF function can be selected by means of the 16 bus selection switches 39 of the mixing bus selection section 33. The LED 40 of the bus selection switch 39, selected as the object of operation to be performed by the SOF function, is switched to the blinked state. By the user further depressing the bus selection switch 39 operating in the SOF mode (i.e., bus selection switch 39 of which the LED 40 was in the blinked state), the operation mode of the fader operators 36, 37 can be switched from the SOF mode to the ordinary mode. Further, the selection of a mixing bus as an object of operation in the SOF mode can be performed in a manner that correspondency between the mixing bus as an object of operation in the SOF mode and the bus selection switch 39 can be easily identified, because the existing bus selection switches 39 are used for this purpose.

To cancel (deactivate or turn off) the SOF function, for example, in a case where, in the ordinary mode (where the SOF function is OFF), another mixing bus than the mixing bus last (i.e., most recently) set as an object of operation to be performed by the SOF function is allocated as an object of operation to be performed by the selected send level operator 38, the user only has to depress twice in succession the bus selection switch 39 (of which the LED 40 was in the non-illuminated state immediately prior to the deactivation of the SOF function) corresponding to the other mixing bus. The same can be said of an operation for set (activating or turning on) the SOF function; namely, the user only has to depress twice in succession a particular bus selection switch 39 corresponding to a mixing bus to be allocated as an object of operation to be performed by the SOF function, without being particularly conscious of the last (i.e., most recent) selection of a mixing bus as an object of operation in the ordinary mode. Thus, the present invention allows the SOF-function turning on/off operation to be performed with an increased operability.

The SOF function has been described above as being turned on or off by the user only depressing twice in succession any one of the bus selection switches 39. Alternatively, where there is no change in the mixing bus set as the object of operation at the time of turning on or off the SOF function (i.e., at the time of effecting operation mode switching), the user may depress only once the bus selection switch 39 corresponding to the mixing bus set as the object of operation, as clear from the description given above with reference to the flow chart of FIG. 6. However, there may be a time difference between the two (first and second) depressions, the two depressions are nothing but operation that takes place following the last (most recent) operation of the bus selection switch 39 (i.e., operation for selecting the switch 39 as an object of operation).

Therefore, the embodiment of the present invention described above can accomplish the superior benefit that the user is allowed to perform, even in a mixer of a relatively inexpensive model equipped with no touch-panel type display, the operation for activating/deactivating the SOF function and selecting an object of operation to be performed by the SOF function in a manner that the ON/OFF setting of the SOF function and selection state of the mixing buses can be identified sensuously and promptly, which can achieve a superior operability without unnecessarily increasing the number of component parts.

When switching the mixing bus set as the object of operation in the SOF mode at step S16 in the above-described embodiment, the object of operation to be performed by the selected send level operator 38 in the selected channel section 32 may also be switched in response to the switching of the object of operation in the SOF mode.

Further, whereas the operation for activating/deactivating the SOF function (i.e., the operation for effecting operation mode switching) has been described above as depressing twice in succession a same bus selection switch 39, such operation for activating/deactivating the SOF function by use of the bus selection switches 39 is not so limited and may be performed by so-called "long-time depression" or simultaneous depression of two bus selection switches 39; in short, any operation schemes, other than the mixing bus selection operation by single depression, may be applied as long as they can instruct activation/deactivation of the SOF function (operation mode switching).

Whereas the present invention has been described so far as an apparatus invention, the present invention is not so limited and may be arranged and implemented as a software program for causing a computer as a communication setting apparatus.

This application is based on, and claims priority to, Japanese Patent Application No. 2006-242028 filed on Sep. 6, 2006. The disclosure of the priority application, in its entirety, including the drawings, claims, and the specification thereof is incorporated herein by reference.

What is claimed is:

1. An audio mixer comprising:

a plurality of channels that process audio signals;

a plurality of mixing buses provided as destinations of respective ones of the audio signals of said plurality of channels;

a plurality of fader operators each provided for a different one of said plurality of channels, said plurality of fader operators being operable to adjust levels of the respective audio signals of said plurality of channels;

a send level adjustment section provided, for each of the channels, in corresponding relation to said plurality of mixing buses, for adjusting the levels of the audio signals to be sent from individual ones of said channels to individual ones of said mixing buses;

a plurality of bus selection switches provided in corresponding relation to said plurality of mixing buses;

a bus selection section that, in response to operation of any one of the plurality of bus selection switches, selects one of said plurality of mixing buses that corresponds to the operated bus selection switch;

a mode setting section that, in response to operation of the bus selection switch corresponding to the currently-selected mixing bus, switches, in a toggle fashion, an operation mode of each of the fader operators between an ordinary mode, where the level of the audio signal is adjusted by use of the fader operator, and a special mode, where a parameter of the send level adjustment section is set by use of the fader operator, wherein, in response to operation of any one of the plurality of bus selection switches that selects a mixing bus different from the currently-selected mixing bus, said mode setting section maintains the currently-set ordinary mode or special mode; and a control section that, in the ordinary mode and in response to operation of the fader operator, adjusts the level of the signal of the channel corresponding to the operated fader operator, and, in the special mode and in response to operation of the fader operator, adjusts the send level of the signal to be sent from the channel, corresponding to the operated fader operator, to the mixing bus selected by said bus selection section.

2. An audio mixer as claimed in claim 1 which further comprises an allocation section that, in the special mode allocates parameters of respective send levels of the signals, to be sent from said plurality of channels to the mixing bus selected by said bus selection section, to individual ones of said plurality of fader operators.

3. An audio mixer as claimed in claim 1 which further comprises a light emitting section provided in each of said plurality of bus selection switches, and a mode setting by said mode setting section is indicated by a light emitting state of said light emitting section.

4. An audio mixer as claimed in claim 1 which further comprises a selected channel section operable by a user for setting audio-signal controlling parameters for a selected one of the channels, said selected channel section including an operator for adjusting a parameter of the send level adjustment section of a selected one of the mixing buses, and wherein, in the ordinary mode, the operator in said selected channel section functions as an operator for adjusting a level of an audio signal of the selected one of the channels that is to be sent to the one mixing bus selected by said bus selection section.

5. A parameter setting method for an audio mixer, the audio mixer including:

a plurality of channels that process audio signals;

a plurality of mixing buses provided as destinations of respective ones of the audio signals of the plurality of channels;

a plurality of fader operators each provided for a different one of the plurality of channels, the plurality of fader operators being operable to adjust levels of the respective audio signals of the plurality of channels;

a send level adjustment section provided, for each of the channels, in corresponding relation to the plurality of mixing buses, for adjusting the levels of the audio signals to be sent from individual ones of the channels to individual ones of the mixing buses; and a plurality of bus selection switches provided in corresponding relation to the plurality of mixing buses, said parameter setting method comprising:

determining that any one of the plurality of bus selection switches has been operated and then selecting one of the plurality of mixing buses that corresponds to the operated bus selection switch;

determining that the bus selection switch corresponding to the currently-selected mixing bus has been operated and then switching, in a toggle fashion, an operation mode of each of the fader operators between an ordinary mode, where the level of the audio signal is adjusted by use of the fader operator, and a special mode where a parameter of the send level adjustment section is set by use of the fader operator;

determining that any one of the plurality of bus selection switches that selects a mixing bus different from the currently-selected mixing bus has been operated, and then maintaining the currently-set ordinary mode or special mode; and in the ordinary mode and in response to operation of the fader operator, adjusting the level of the signal of the channel corresponding to the operated fader operator, and, in the special mode and in response to operation of the fader operator, adjusting the send level of the signal to be sent from the channel, corresponding to the operated fader operator, to the mixing bus selected by said bus selection section.

6. A computer-readable storage medium containing a group of instructions for causing the computer to perform a parameter setting method for an audio mixer, the audio mixer including:

a plurality of channels that process audio signals;

a plurality of mixing buses provided as destinations of respective ones of the audio signals of the plurality of channels;

a plurality of fader operators each provided for a different one of the plurality of channels, the plurality of fader operators being operable to adjust levels of the respective audio signals of the plurality of channels;

a send level adjustment section provided, for each of the channels, in corresponding relation to the plurality of mixing buses, for adjusting the levels of the audio signals to be sent from individual ones of the channels to individual ones of the mixing buses; and a plurality of bus selection switches provided in corresponding relation to the plurality of mixing buses, said parameter setting method comprising:

determining that any one of the plurality of bus selection switches has been operated and then selecting one of the plurality of mixing buses that corresponds to the operated bus selection switch;

determining that the bus selection corresponding to the currently-selected mixing bus has been operated and then switching, in a toggle fashion, an operation mode of each of the fader operators between an ordinary mode, where the level of the audio signal is adjusted by use of the fader operator, and a special mode where a parameter of the send level adjustment section is set by use of the fader operator;

determining that any one of the plurality of bus selection switches that selects a mixing bus different from the currently-selected mixing bus has been operated, and then maintaining the currently-set ordinary mode or special mode; and in the ordinary mode and in response to operation of the fader operator, adjusting the level of the signal of the channel corresponding to the operated fader operator, and, in the special mode and in response to operation of the fader operator, adjusting the send level of the signal to be sent from the channel, corresponding to the operated fader operator, to the mixing bus selected by said bus selection section.

* * * * *